(12) United States Patent
Jackson et al.

(10) Patent No.: US 12,008,455 B2
(45) Date of Patent: Jun. 11, 2024

(54) PERSONALIZED VEHICLE RECOMMENDER SYSTEM

(71) Applicant: Driverbase Inc., Seattle, WA (US)

(72) Inventors: Dan Jackson, Cochester, VT (US);
Andrew Bays, Littleton, MA (US);
Eric Parziale, Pinehurst, NC (US)

(73) Assignee: Driverbase Inc., Seattle, WA (US)

( * ) Notice: Subject to any disclaimer, the term of this patent is extended or adjusted under 35 U.S.C. 154(b) by 1073 days.

(21) Appl. No.: 16/444,513

(22) Filed: Jun. 18, 2019

(65) Prior Publication Data
US 2021/0166103 A1 Jun. 3, 2021

(51) Int. Cl.
*G06N 3/042* (2023.01)
*G06N 3/08* (2023.01)
*G06Q 30/0601* (2023.01)

(52) U.S. Cl.
CPC ............... *G06N 3/042* (2023.01); *G06N 3/08* (2013.01); *G06Q 30/0631* (2013.01)

(58) Field of Classification Search
None
See application file for complete search history.

(56) References Cited

U.S. PATENT DOCUMENTS

| 8,037,080 | B2 | 10/2011 | Koren |
| 8,560,161 | B1 | 10/2013 | Kator et al. |
| 9,262,534 | B2 | 2/2016 | Martin et al. |
| 9,589,237 | B1 | 3/2017 | Qamar |
| 11,348,053 | B2* | 5/2022 | Anagnos ............... G07C 5/008 |
| 2012/0284118 | A1* | 11/2012 | Mamich, Jr. ....... G06Q 30/0261 705/14.58 |
| 2015/0254719 | A1* | 9/2015 | Barfield, Jr. ....... G06Q 30/0261 701/31.5 |
| 2016/0283962 | A1* | 9/2016 | Chan ................. G06Q 30/0222 |

(Continued)

FOREIGN PATENT DOCUMENTS

WO 2018083669 A1 5/2018

OTHER PUBLICATIONS

Tseng, Gabriel, "Intro to WARP Loss, automatic differentiation and PyTorch", Dec. 6, 2017, <URL: https://medium.com/@gabrieltseng/intro-to-warp-loss-automatic-differentiation-and-pytorch-b6aa5083187a>, retrieved Aug. 11, 2022 (Year: 2017).*

(Continued)

*Primary Examiner* — Christopher J Fibbi
(74) *Attorney, Agent, or Firm* — Andrus Intellectual Property Law, LLP (57) ABSTRACT

A vehicle recommender system includes a storage system storing a trained neural network trained to generate a vehicle recommendation, a vehicle database comprising vehicle attribute data, and a driver database comprising driver profile data. A processing system communicates with the storage system and is configured to generate enriched driver profile data by comparing user-generated driver profile data to the location characteristic data and social characteristic data. The processing system calculates a driver attribute target value for each vehicle attribute category in a list of vehicle attribute categories based on the driver profile data, and then generates, using the trained neural network, at least one vehicle recommendation based on at least the vehicle attribute data and the driver attribute target values.

15 Claims, 7 Drawing Sheets

(56) References Cited

U.S. PATENT DOCUMENTS

| | | | |
|---|---|---|---|
| 2017/0337573 A1* | 11/2017 | Toprak | G06Q 30/0278 |
| 2018/0189286 A1 | 7/2018 | Cao et al. | |
| 2018/0330422 A1 | 11/2018 | Ras et al. | |
| 2019/0026274 A1 | 1/2019 | Deng et al. | |
| 2019/0043606 A1 | 2/2019 | Roots et al. | |
| 2020/0082287 A1* | 3/2020 | Beaurepaire | G06N 5/047 |
| 2020/0134690 A1* | 4/2020 | Wang | G06Q 30/0631 |
| 2020/0202410 A1* | 6/2020 | Edwards | G06Q 30/0641 |
| 2020/0311796 A1* | 10/2020 | Tang | G06Q 30/0631 |

OTHER PUBLICATIONS

Hong-Jian Xue et al., Deep Matrix Factorization Models for Recommender Systems, Proceedings of the Twenty-Sixth International Joint Conference on Artificial Intelligence, pp. 1-7, Nanjing University, Nanjing 210023, China.

Stolee et al., Matrix Factorization with Neural Networks and Stochastic Variational Inference, pp. 1-8, Department of Computer Science, University of Toronto.

* cited by examiner

PERSONALIZED VEHICLE RECOMMENDER SYSTEM

BACKGROUND

The present disclosure generally relates to recommender systems, and more particularly to systems and methods for providing personalized vehicle recommendations optimized for a particular driver.

Recommender systems, or recommendation engines, are information filtering systems that seek to predict the rating or preference that a user would give to an item without requiring user input regarding that particular item. Recommender systems are used in many commercial applications, and are used heavily in ecommerce platforms. For example, recommender systems are used as playlist generators for music and video platforms and as product recommenders for online marketplaces, such as Amazon.

There are a few different types of, or approaches to, recommender system design. One common recommender system design uses collaborative filtering. Collaborative filtering is based on the idea that if users rate items similarly in the past, they are likely to rate other items similarly in the future—e.g., people will like similar kinds of items in the future as they have liked in the past. Collaborative filtering systems generate recommendations using only information about rating profiles for different users or items, such as based on peer users that are similar to a current user and/or based on similar items with qualities or rating history similar to a current item. The most popular collaborative filtering technique is matrix factorization, which learns a latent space to represent a user or an item. In the latent space, the recommender system predicts a personalized ranking for a set of items for each individual user with the similarities among the users and the items. Another common recommender system design is content-based filtering. Content-based filtering methods are based on a description of the item and user profile data that includes preferences for a user. Content-based filtering methods are often used in situations where more data is known about an item than a user. Content-based recommenders treat recommendation as a user-specific classification problem and learn a classifier for the user's likes and dislikes based on product features. The aim of content-based filtering recommenders is to learn a user's preferences based on that user's actions regarding one content source and use the across other content sources or content types. Another recommender system approach is a hybrid recommender system, which combines collaborative filtering and content-based filtering, and may also combine other filtering approaches. Hybrid approaches are implemented in several different ways, such as by combining predictions made by separate content-based filtering and collaborative-based filtering separately, or by adding content-based capabilities to a collaborative-based filtering approach, or vise versa.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a vehicle recommender system includes a storage system storing a neural network trained to generate vehicle recommendations, a vehicle database comprising vehicle attribute data, and a driver database comprising driver profile data. A processing system communicates with the storage system and is configured to generate enriched driver profile data by comparing user-generated driver profile data to the location characteristic data and/or social characteristic data. The processing system calculates a driver attribute target value for each vehicle attribute category in a list of vehicle attribute categories based on the driver profile data, and then generates, using the trained neural network, at least one vehicle recommendation based on at least the vehicle attribute data and the driver attribute target values which are provided as inputs.

A method of generating a vehicle recommendation for a driver includes receiving driver profile data about a driver, receiving vehicle attribute data regarding each vehicle class in a list of vehicle classes, and receiving a list of vehicle attribute categories. A driver attribute target value is generated for each vehicle attribute category based on the driver profile. At least one vehicle recommendation is then generated by a trained neural network based on the vehicle attribute data and the driver attribute target values.

Another embodiment of a method of generating a vehicle recommendation for a driver may include storing a list of vehicle attribute categories and storing vehicle attribute data for each vehicle class in a list of vehicle classes. The vehicle attribute data includes, for each vehicle class, a vehicle attribute value for each vehicle attribute category. The method further includes storing user-generated driver profile data inputted by a driver and storing location characteristic data and social characteristic data. Enriched driver profile data is then generated by comparing the user-generated driver profile data to the location characteristic data and/or the social characteristic data. A driver attribute target value is calculated for each vehicle category in the list of vehicle attribute categories based on the driver profile data, which includes the enriched driver profile data and the user-generated driver profile data. A vehicle recommendation is then generated using a trained neural network based on at least the vehicle attribute data and the driver attribute target values, which are provided as inputs.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

The inventor has recognized a need for an improved system for optimizing the vehicle purchase process and helping drivers determine an optimal vehicle for them based on their driving habits, cargo and transportation needs, financial constraints, location, preferences, etc. The inventor has also recognized that the vehicle purchasing process is different than most other product purchasing processes, and that standard product recommender systems are not appropriate or easily adapted for recommending vehicles to purchasers for several reasons. Vehicle purchases are very high dollar and low frequency purchases. Moreover, vehicle shopping is often done in person, such as by visiting a car lots or other sales locations of vehicles so that the purchaser can view and drive the vehicle. Thus, very little information is available about user actions that are useful to standard recommender systems, such as those utilized in online marketplaces. For example, previous shopping or purchase information, and/or click rate information, is not sufficiently available from which to develop a useful vehicle recommender system using standard recommender inputs and design.

Moreover, the inventor has recognized that the purchasing process and/or payment arrangements for vehicles are more complex than for other lesser-value products, and that individuals spend varying percentages of their income on vehicles and have varying preferences regarding vehicle payment arrangements. Available purchase arrangements range from all-cash purchases to financing (with interest rates ranging from 0% to relatively high interest rate percentages), to leasing, or even rental or other fee-based arrangements. Moreover, vehicle pricing is not fixed and prices are often negotiated on a per-vehicle basis. Further, varying state taxes on vehicle sales further complicate the vehicle shopping process. Moreover, the complexity of vehicles themselves further complicates the buying process, and the inventor has recognized that an effective vehicle recommender system needs to accommodate and consider the complexities of the vehicle market and the vehicle products. Vehicle manufacturers typically bundle features in their product lines or product series, and such constraints can be difficult for buyers to navigate.

Moreover, given that most new vehicle sales and a large portion of used vehicle sales occur through dealerships, there is often an asymmetry of information where buyers may have a difficult time accessing information about vehicle specifications and/or pricing for particular vehicles. Furthermore, there are very few unbiased and freely available sources of information regarding vehicles because most information is either controlled or filtered by organizations that have financial conflicts of interest. Vehicle productions are updated frequently by manufacturers and, particularly with the introduction of electric propulsion and autonomous driving technologies, the car search is becoming even more fragmented, time consuming, and complicated. Therefore, an effective vehicle recommender system must be designed to incorporate each driver's profile to determine the most relevant vehicles and these recommendations must be automatically updated as products are introduced and/or discontinued.

The inventor has developed a personalized vehicle recommender system that enables users, which may include individual drivers, dealerships, and manufacturers, and or automotive organizations, to interact with the system and with each other. The recommender system allows individual drivers to create a profile, and the system has been designed to collect relevant information from a driver from which, based on an agglomeration of collected information, a personalized vehicle recommendation can be made for that individual driver. The system is configured to elicit user-generated information from each driver, which may include personal information (name, birthdate, address, demographic information, contact information, etc.), driving practices information (passenger and cargo demands, driving routes and times, total weekly/monthly/annual mileage, and the like), and vehicle ownership information (current vehicles, current vehicle ratings, past vehicles, past vehicle ratings, purchase method, and the like). The user-generated information may also include relationships to other users and may enable interactions between or among users. For example, a household of individuals that share cars may be related together within the system.

Based on their substantial expertise in the relevant field, the inventor has recognized that providing accurate and useful vehicle recommendations requires a wide range of information about both the driver and about all available vehicle types, or vehicle classes. Within each vehicle brand and model, several different vehicle classes may exist, depending on available features and trim packages. Accordingly, vehicle class may account for more than just a vehicle make and model, but also may reflect various upgrades, engine sizes, and features, all of which may be a factor in vehicle price. The inventor developed a system that gathers, aggregates, and unifies information about a list of vehicle classes, which may include every available vehicle class. The recommender system 10 may be configured to automatically update the list of vehicle classes as new vehicle classes become available, such as based in vehicle data obtained from manufacturers, dealerships, or other retailers. Vehicle information about each vehicle class includes standard factual information about each vehicle, including year, make, model, trim, power train, performance rating, reliability rating, average miles per gallon (MPG) or an equivalent efficiency rating, average price, and a new or used classifier. More qualitative information is also gathered, such as relating to safety, style, reliability, performance, cargo and/or towing capabilities, and telematics or other automation features. The vehicle data is gathered from various sources and by various mechanisms as is described below in more detail.

Driver profile data includes the user-generated profile data described above, including personal information, driving practices information, and vehicle ownership information, as well as enriched driver profile data. Enriched driver profile data is generated by correlating the user-generated driver profile data entered by the user to demographic, location, and other information available from data sources. Thus, generating enriched driver profile data includes making informed assumptions about a user based on the user-generated information. For example, enriched driver profile data may be generated by comparing the user generated driver profile data to location characteristic data, such as data from the National Weather Service, traffic tracking and mapping sources (such as Google), the Internal Revenue Service (IRS), Bureau of Labor Statistics (BLS), or the like. As described in more detail below, such data may be gathered via application programming interfaces (APIs) or may be purchased or available from the data source as a flat file. The location characteristic data includes climate and/or weather-related information, altitude information, driving conditions, regional traffic data, regional industry data, regional sales data, or the like.

The enriched driver profile data may further be based on social characteristic data obtained by the system. For example, census data may be obtained (such as via an API that interacts with Census Bureau databases) that provides social characteristics, economic data, housing data, and demographic characteristics that can be related to the user-generated driver profile data in order to enrich the known information about a user. To provide one example, the user may input their location, age, and occupation. From that information, enriched profile information can be determined about that driver's annual income and, in certain embodiments, vehicle type and budget preferences. For example, certain vehicle brand and type preferences may be assumed or given higher weight based on a driver's location—e.g., regional vehicle popularity may be considered. To provide another example, information regarding congestion and parking availability may be considered—e.g., a driver that indicates a home address associated with a high-rise apartment in a large city may be assumed to desire a small or standard-size vehicle rather than a large vehicle with towing capacity. Similarly, demographic and housing characteristics can be associated with certain vehicle-related preferences. In this way, the requirement for user-generated information can be minimized, making the system easier to use and more robust.

The information is assimilated and homogenized into a pre-determined format so that appropriate comparisons and data analysis can be conducted. In certain embodiments, data clustering and matrix factorization techniques may be utilized to generate vehicle recommendations. Through experimentation and research, and based on expert knowledge relevant to the vehicle market, the inventor has also recognized that employing deep learning methods improves the vehicle recommendation outcomes and provides a flexible and adaptive system. Namely, in certain embodiments, neural network architecture is employed to learn a common latent low-dimensional space to represent the drivers registered in the system and available vehicle models. For example, a hybrid recommender model may be created using neural network architecture that performs deep matrix factorization and content based filtering using a neural network trained to map users, content, and vehicles into a common low-dimensional space with non-linear projections. Inputs to the neural network may include driver profile data, vehicle attribute data, and/or driver attribute target values. For example, a matrix input may be provided, such as a driver-vehicle matrix. Explicit and/or implicit feedback may be utilized as input to the model.

In one embodiment, a weighted approximate-rate pair-wise (WARP) loss function is utilized. For example, the WARP loss function may be incorporated and adapted for considering the particular explicit and implicit feedback data available to the vehicle recommender system and maximizing outcomes for a specific driver. The WARP loss function maximizes the rank of positive examples by repeatedly sampling negative examples until a rank-violating one is found. Area under the curve (AUC) is calculated to evaluate recommendation accuracy. Recommendations automatically update for all drivers when at least one driver edits their profile, adds a vehicle, rates a vehicle, or accepts or declines a vehicle recommendation. In certain examples, recommendations are regenerated for a driver when their current vehicle odometer reading is automatically adjusted based on their profile, driving patterns, life stage, past driving behavior and current date. Separately, as a driver progresses through the various life stages recommendations are regenerated to personalize ownership preferences by age. The learning system runs epochs (iterations) of different models to fit the data. The most accurate models survive and less accurate discarded. Randomness is built into the model to distribute and vary the recommendations across the universe of drivers. The vehicle recommender system 10 is a continuous cycle. Driver vehicle ratings are captured for current vehicles and recommendations, aggregated and used as input data to improve recommendation quality.

Figure 1:
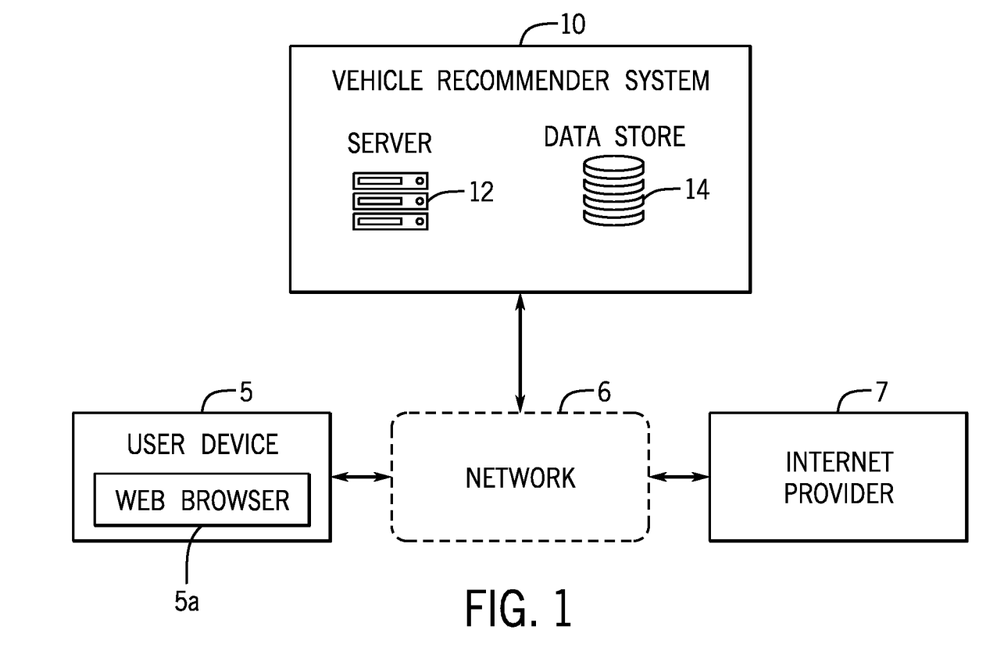
FIG. 1 is a schematic diagram of an embodiment of a vehicle recommender system according to the present disclosure and a network environment enabling operation thereof.

FIG. 1 depicts a recommender system comprising a processing system 12 and a storage system 14. The storage system 12 stores vehicle attribute data and driver profile data, as described above. In one embodiment, a vehicle database 44 stores vehicle attribute data and a driver database 34 stores driver profile data. The processing system 12 is communicatively connected to the storage system 14 and may comprise a single processor or multiple networked processors. The recommender system 10 receives information from a user device 5 via a network 6 and receives other information, such as vehicle data and characteristic data gathered by APIs operating and communicating on the internet 7 via the network 6. The user device 5 operates a web browser 5a to allow a driver to interact with the recommender system 10. For example, the driver inputs the user-generated profile information and also receives the vehicle recommendations via the web interface provided via the web browser 5a. In other embodiments, the user device 5 may interface with the recommender system 10 via an application running on the user device 5.

Figure 2:
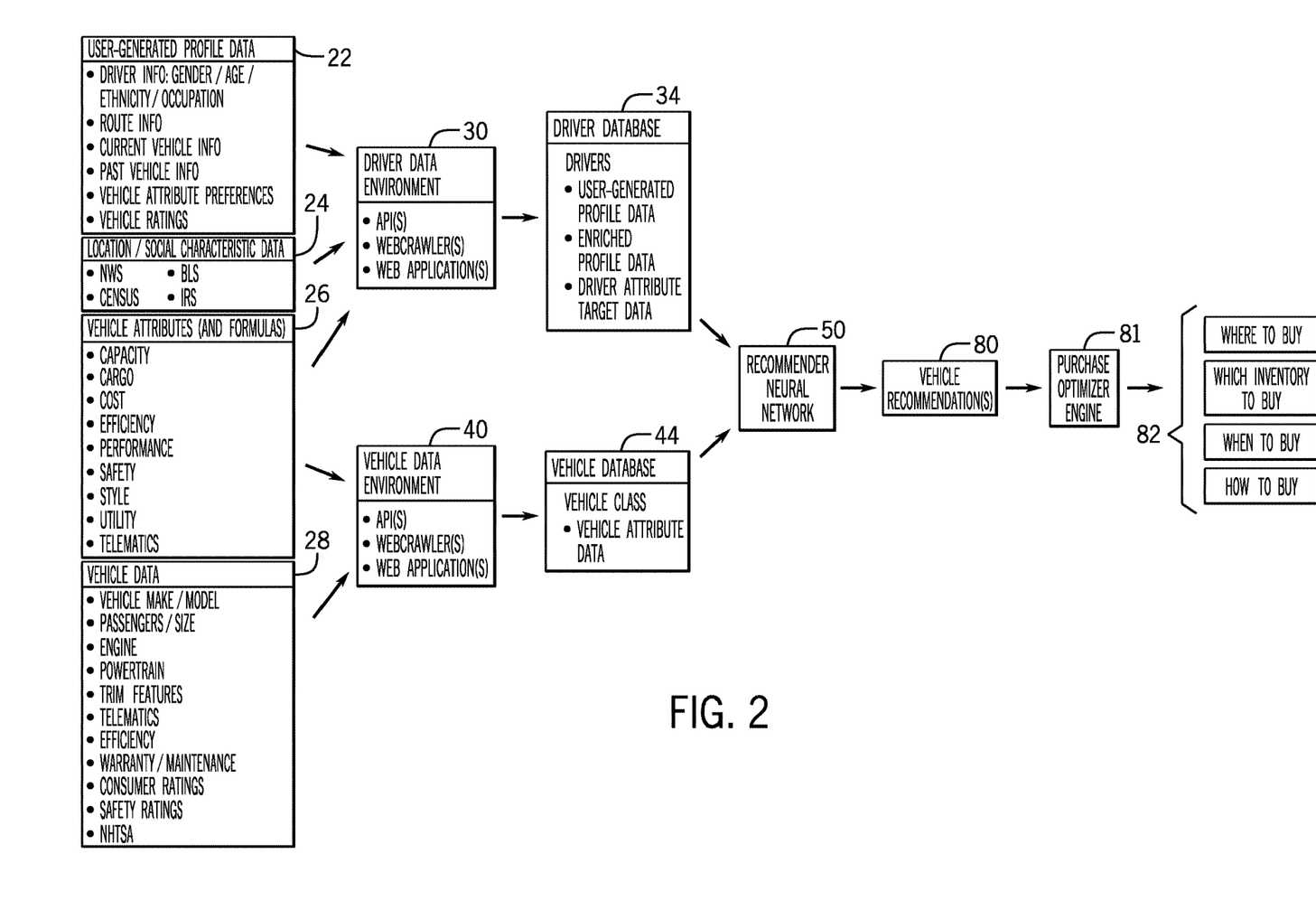
FIG. 2 is another schematic diagram of an embodiment of a recommender system according to the present disclosure.

FIG. 2 schematically depicts one embodiment of a vehicle recommender system. The left-most column represents various data types and informational inputs provided to and utilized by the recommender system 10. A set of vehicle attributes 26 is established, which is a list of categories—e.g., capacity, cargo, cost, efficiency, performance, safety, style, utility, and telematics. The categories define the structure for the vehicle and driver datasets, where vehicles are rated and drivers and vehicles are matched based thereon. In the depicted example, the vehicle attributes include capacity, cargo, cost, efficiency, performance, safety, style, utility, and telematics. Each vehicle will be given a value for each vehicle attribute based on the vehicle data. Additionally, a target value will be determined for each vehicle attribute category for each driver, which is referred to herein as driver attribute target values. Namely, a driver attribute target value is calculated for each vehicle attribute category 26 based on the driver profile data, which includes the user-generated driver profile data 22 as well as the enriched profile data.

Formulas may be established for each vehicle attribute category 26 in order to calculate the vehicle attribute data based on the vehicle data 28 and to calculate the driver attribute target data based on the driver profile data. The vehicle attribute categories 26 and their respective formulas may be set by a system administrator and define the way by which the drivers and vehicles are compared to one another. For example, the vehicle attribute data may comprise a vehicle attribute value as a rating between 0 and 10 for each of the vehicle attribute categories 26. Similarly, the driver attribute target data may include a value between 1 and 10 for each vehicle attribute category 26, which is the level of import that the attribute category holds in the matching determination.

Figure 3A:
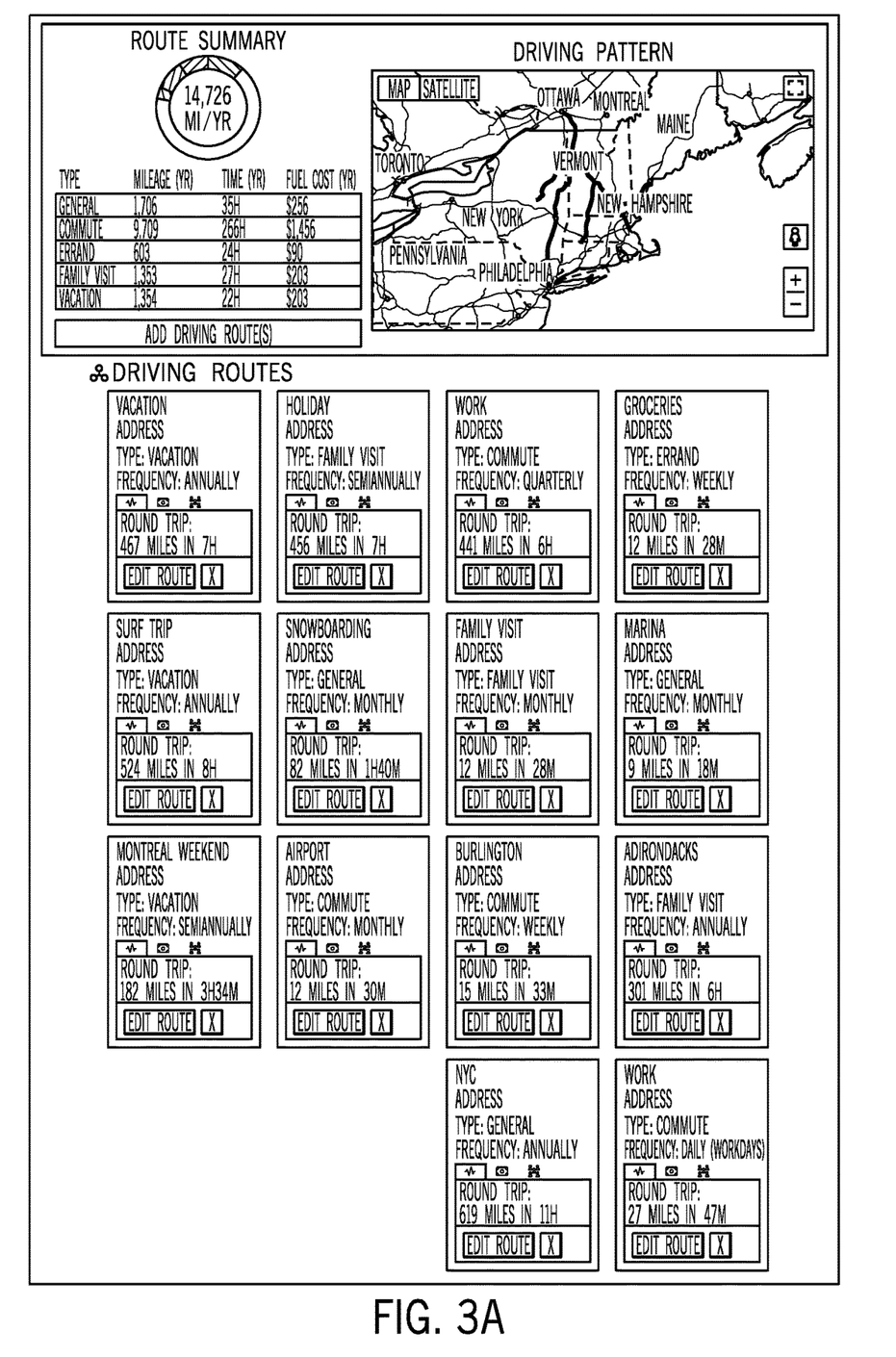
FIGS. 3A-3B depict exemplary embodiments of user interfaces for collecting and displaying user profile data.

The user generated profile data 22 is inputted by a user, such as via a user device 5 presenting a user interface designed to collect such data. The user interface is configured to prompt a user to input various data types, including the personal information, driving practices information, and vehicle ownership information described above. The personal information may include such things as gender, age, ethnicity, occupation, employments status, industry, family size, pets, etc. Additionally, location and contact information may be inputted. Driving practices information is also gathered, such as route information, information relating to numbers and types of passengers, driving times, etc. FIG. 3A shows an exemplary user interface depicting several routes inputted by a driver, which include "commute" routes and "errand" routes that are repeated at a certain frequency, such as daily, weekly, or quarterly. "Vacation" and "family visit" routes are also inputted along with an estimated frequency of each route. This route information can be utilized to gather significant amounts of information, including information relating to region and location in which the individual drives, weather and traffic conditions therein, mileage and mileage type (city or highway), and the like.

Figure 3B:
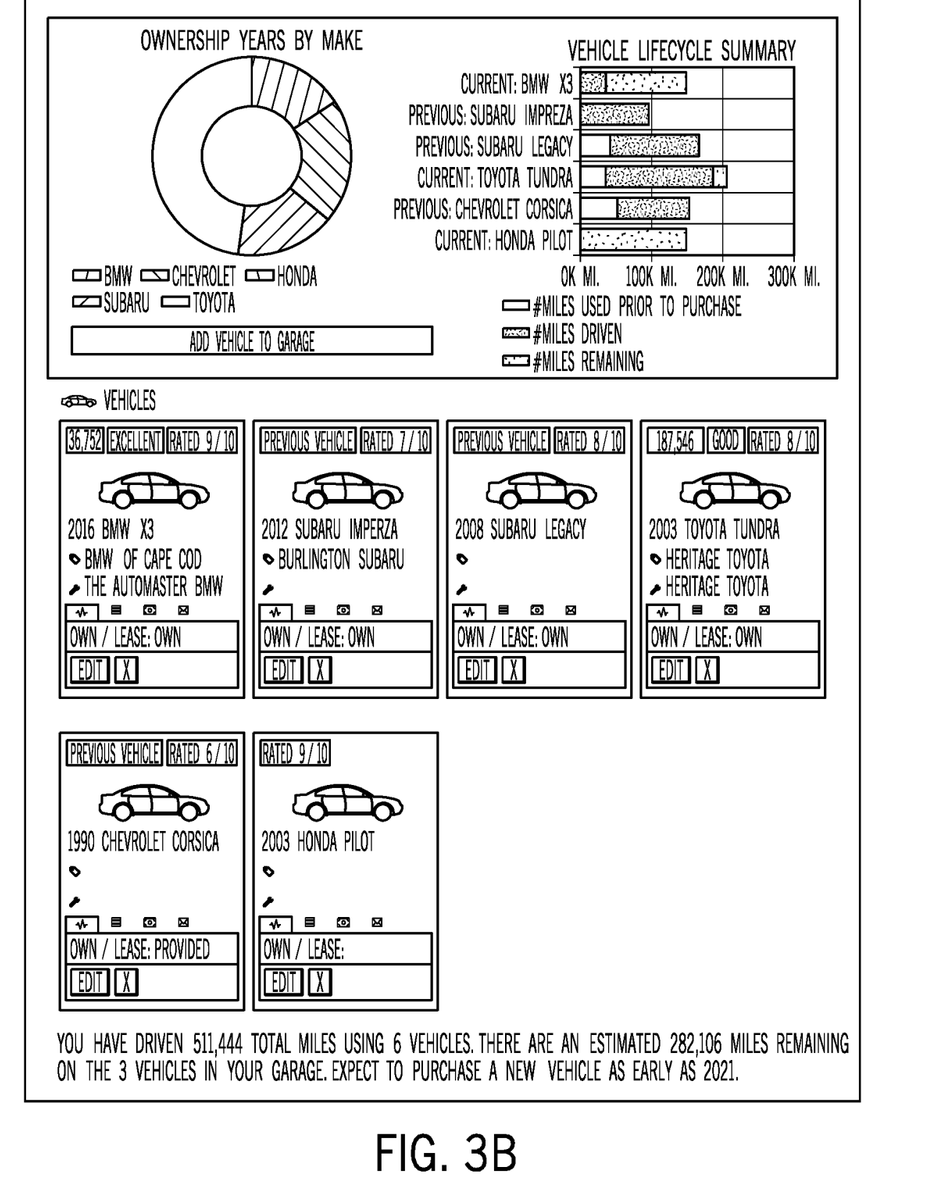

Vehicle ownership information is also provided including current vehicle information about the vehicle or vehicles currently owned by a driver and past vehicle information about vehicles previously owned by a driver. FIG. 3B depicts on example of a user interface display showing vehicle ownership information for a driver, including current vehicle information and past vehicle information inputted by the driver. For each current and past vehicle, mileage, price, and ownership type (lease or own) are inputted by the user. Additionally, the system may request a driver to provide a purchase location, such as a dealership, and/or a vehicle service provider for that vehicle. Additionally, each current and past vehicle may be rated by the user, which may be a single overall rating or may be a rating based on various categories. These categories may have overlap with the vehicle attribute categories, or may be different. This vehicle ownership information may be utilized to create enriched driver profile data, such as to calculate information regarding the total miles driven by the user, the number of vehicles that the user typically owns at one time, and estimated miles or time remaining on each vehicle, and/or an estimated time that that driver will be purchasing a new vehicle. Additionally, the enriched driver profile data may include information regarding how many miles a driver can expect to drive on a vehicle and when they may expect to purchase a new vehicle in the future. As exemplified in FIG. 3B, such enriched driver profile data may be provided to the driver via the user interface.

Additionally, the user interface may prompt a user to input, or assign, their own preferences for the vehicle attribute categories 26. For example, the user may be asked to rate how they rank each category in terms of importance, such as on a 1 to 10 scale, or by ranking them from most important to least important. This information can be used to inform the driver attribute target data calculation for that driver, as one piece of information considered in the formula, for example. Additionally, the user interface may prompt or allow the driver to input vehicle ratings for vehicles other than those that they currently or previously own.

User-generated profile data 22 and characteristic data 24 are provided to and collected in a driver data environment 30, which may include one or more daemons that reconcile and append data, that generates a driver database 34 containing the driver profile data. Specifically, the driver data environment 30 includes various APIs, web crawlers, web applications and data processing programs that homogenize the collected data into a predetermined format. Once homogenized, the data is stored in the driver database 34. The driver profile data stored in the driver database 34 is updated by reconciling any new or changed data sent by the driver data environment 30 against the existing driver profile data stored in the driver database 34. Thereby, the driver profile data is continually updated as users input or change the user-generated profile data and/or as the characteristic data 24 is modified.

The user-generated profile data 22 inputted by the driver is compared to other information known by the system 10, which includes the characteristic data 24. The location and social characteristic data 24 includes various geographical and social information that relates to vehicles, including public (census), private and directly collected. As explained above, the characteristic data 24 may be obtained by utilizing particular APIs, for example, or may be obtained by web crawlers or other information-gathering programs. The characteristic data 24 is used to enrich the driver profile data, as explained above, and the enriched and user generated driver profile data are saved in a driver database 34. Driver attribute target data containing driver attribute target values for each of the vehicle attribute categories 26 is generated based on the driver profile data, such as according to a pre-determined formula for such calculation.

Vehicle data 28 is similarly provided to the vehicle data environment 40, which may include one or more daemons configured to reconcile and append data, to reconcile, homogenize, and append data in order to create the vehicle database comprising vehicle attribute data. Vehicle data 28 gets collected from various public, private and direct collection sources and providers, and then gets homogenized and stored in the vehicle database 34. The vehicle data is collected, for example, from manufacturers, automotive organizations, warranty and maintenance providers, consumer rating organizations, etc. Vehicle data may also be collected from public organizations, such as the National Highway Traffic Safety Administration (NHTSA). As described above, vehicle data 28 includes vehicle make, model, and year, as well as information about the size of the vehicle, including the number of passengers and cargo space accommodated. Vehicle data 28 also include information about the engine, power train, telematics and autonomous functionalities, trim features, safety features, and the like. Vehicle data 28 might further include information about efficiency of the vehicle, such as the MPG rating and/or other rating applicable to electric vehicles. The collected vehicle data may further include other information including warranties, such as manufacture warranties, such as routine maintenance requirements specified by a manufacturer. The vehicle data 28 may also include rating information, such as consumer and safety ratings.

The vehicle data 28 may be collected by various means and provided to the vehicle data environment 40. For example, APIs may interface with data providers regarding vehicle data and web crawlers may collect data from various sources available on the internet. Web applications and back end data processing programs receive and homogenize the collected data, which gets persisted to the vehicle database once homogenized into the appropriate format such that it can be reconciled against the existing vehicle attribute data.

The driver attribute target data and the vehicle attribute data are provided to the recommender neural network 50. In certain embodiments, the driver profile data, including the user-generated profile data and/or the enriched profile data, may also be provided to the recommender neural network 50. The recommender neural network 50 is configured to receive the driver and vehicle data and to generate a vehicle recommendation, or a set of vehicle recommendations. For example, the trained recommender neural network 50 may be a multi-layer recurrent neural network (RNN) that models the user data and vehicle data, and the interactions between vehicles and users. In such an embodiment, the recommender neural network 50 provides sequence-based user representation that evaluates a driver's past vehicles and discounts the weight of older vehicles and older driver profile data, using that information to predict the next appropriate vehicle for that driver. Alternatively, the trained recommender neural network 50 may be a multi-layer feedforward neural network that models the user data and vehicle data, and the interactions between vehicles and users. The feed-forward embodiment may be particularly useful for users where the available driver profile data is limited and/or does not include historical data regarding previously owned vehicles. In certain examples, the system 10 may include two or more neural networks trained for outputting vehicle recommendations, and the system 10 may be configured to select an appropriate network based on the available driver profile data to provide an optimal recommendation for a particular driver.

Figure 4:
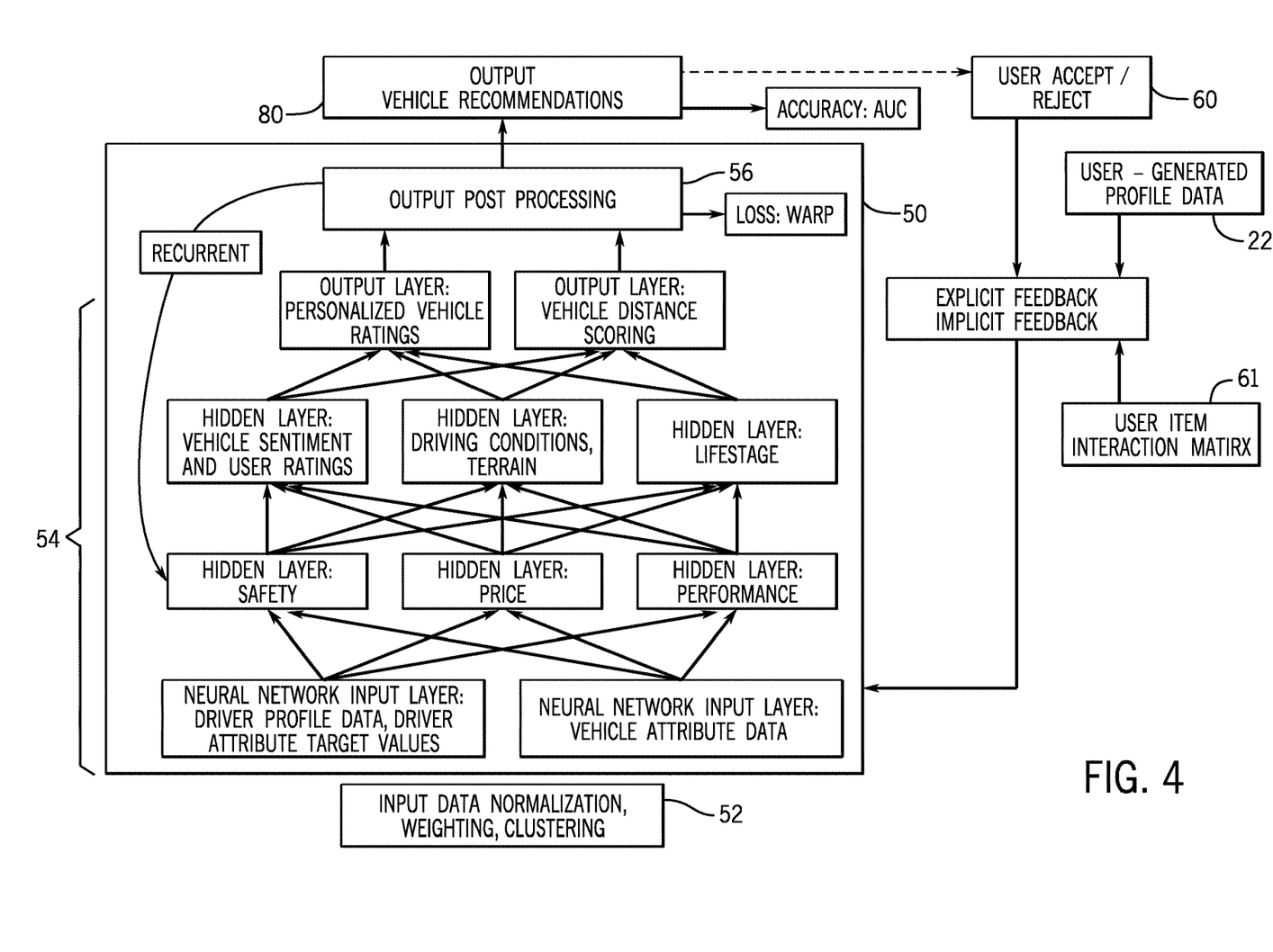
FIG. 4 schematically depicts an exemplary neural network for use in a vehicle recommender system according to one embodiment of the present disclosure.

FIG. 4 schematically depicts an exemplary embodiment of the recommender neural network 50, which in the depicted embodiment is a recurrent neural network comprising multiple processing layers 54. The recommender neural network 50 receives vehicle attribute data, driver attribute target values, and driver profile data as inputs, and outputs vehicle recommendations. The data is normalized in one or more input data normalization layers 52 and/or processing steps, which may include data standardization steps and implementing data weighting and/or data clustering algorithms. The normalized data is then subjected to multiple processing layers 54 for making various factorizations or determinations for identifying the optimal vehicle for the particular driver. For example, multiple hidden layers may be included for assessing various aspects of the vehicle recommendation analysis, such as for assessing vehicle and driver data relating to certain vehicle attribute categories. The neural network 50 may be configured to output a single recommendation, or to output multiple recommendations. For example, the neural network 50 may be configured for ranking every driver with every vehicle and outputting top-N recommendations. The post-processing layer or layers 56 assimilate the output data and generate the vehicle recommendations 80.

The recommender neural network 50 may, for example, output a vehicle identification for each recommended vehicle, and the vehicle recommendations 80 presented to the user may include the vehicle data associated with the vehicle class ID. For example, a new vehicle class ID may be generated for every new vehicle class added to the list of vehicle classes recognized by the recommender system 10. In one embodiment, a user may provide explicit feedback 60 regarding the vehicle recommendations, such as accepting or rejecting each recommendation. The user input 60 can be used as explicit feedback to the neural network 50. Implicit feedback may also be provided, such as by changes to the user-generated profile data 22 and user-item interaction matrices 61. In one embodiment, WARP loss function and AUC accuracy scoring may be utilized as the learning algorithm.

Referring again to FIG. 2, the vehicle recommendation(s) 80 may be provided to a purchase optimizer engine 81 that generates one or more vehicle purchase recommendations 82 based on the vehicle recommendation(s) 80. The vehicle purchase recommendations may include a recommended vehicle class (e.g., which model or trim level to purchase), a recommended purchase location (i.e., where to buy the recommended vehicle(s)), a recommended inventory (e.g., which exact vehicle or group of vehicles to buy), a recommended purchase time (e.g., when is the best time to purchase in order to optimize ownership satisfaction, purchasing power and/or optionality), and a recommended purchase method (e.g., cash, finance, or lease). For example, the vehicle recommender system 10 may include or access a database of available vehicles submitted or otherwise provided from dealerships, manufacturers, or other vehicle retailers or sellers, and such database may be utilized by the purchase optimizer engine 81 to generate optimal purchase recommendations for the particular driver and the particular vehicle recommendations. For example, vehicle retailers may pay to list their inventory and have it matched against the vehicle recommendations generated for drivers. Thereby, a purchase location and inventory recommendation may be generated by the purchase optimizer engine 81. Namely, the purchase optimizer engine 81 may be configured to compare the driver profile data to available financing and leasing options, etc., to further generate purchase method recommendations, such as a purchase method recommendation for each purchase location and/or inventory recommendation.

Figure 5:
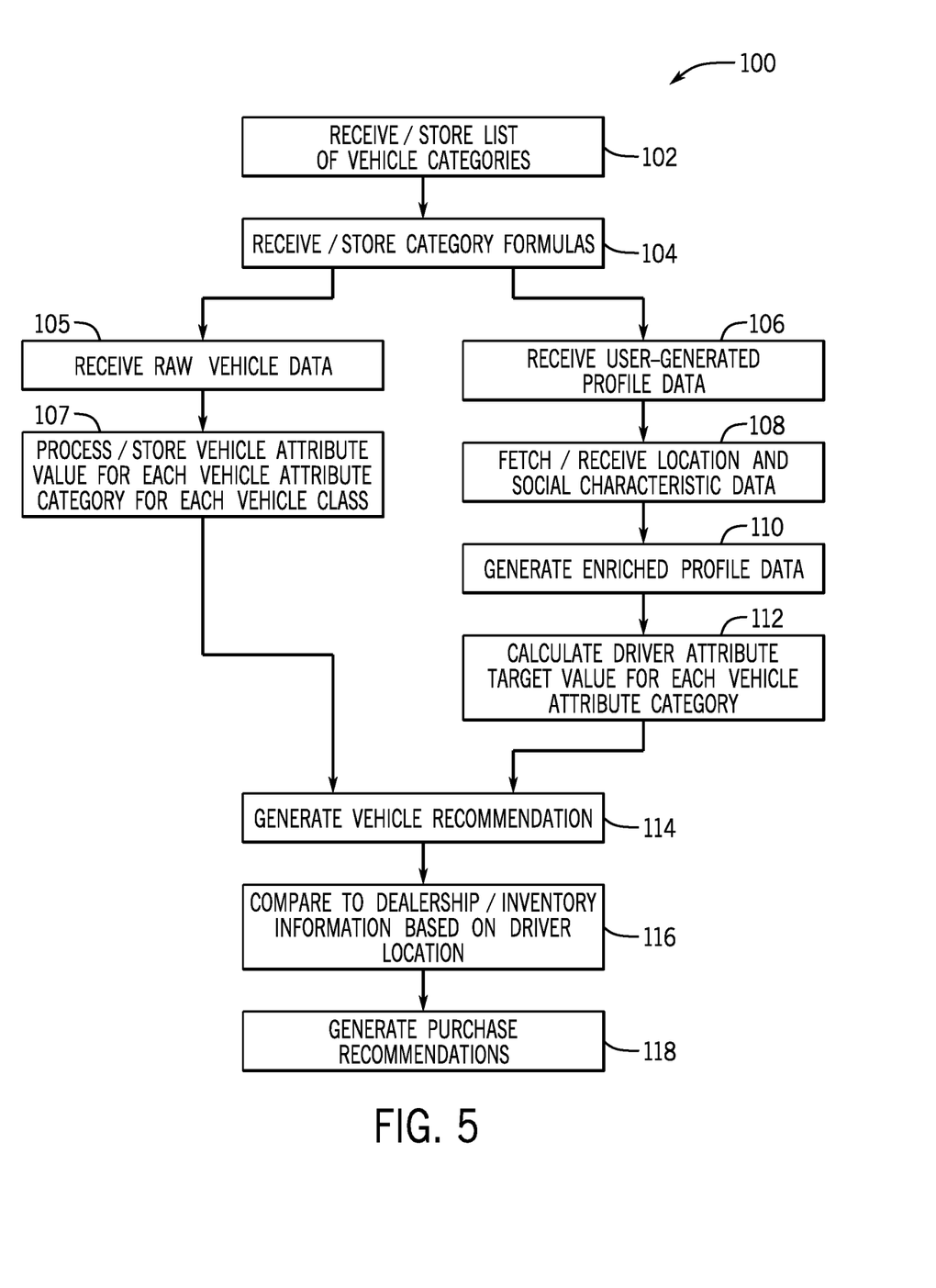
FIG. 5 depicts a method of generating a vehicle recommendation for a driver according to one embodiment of the present disclosure.

FIG. 5 depicts one embodiment of a computer implemented method 100 of generating one or more vehicle recommendations for a driver. A list of vehicle categories is received and stored at step 102 and category formulas are received and stored at step 104. Raw vehicle data is received at step 105, such as the vehicle data 28 described above. The vehicle data is processed and a vehicle attribute value is generated for each vehicle attribute category for each vehicle class. The vehicle attribute values are stored in a vehicle database at step 107, as described above.

User generated profile data is received at step 106, which is the data inputted by the driver via the user interface for the vehicle recommender system 10. Location and social characteristic data is fetched and/or received at step 108. For example, the location and social characteristic data may include, National Weather Service data, NHTSA data, IRS, BLS, and/or census data. Enriched profile data is generated at step 110 based on the user-generated profile data and the location and social characteristic data. A driver attribute target value is calculated for each vehicle attribute category at step 112. The driver attribute target value is calculated based on the driver profile data, which includes the user-generated driver profile data and the enriched driver profile data. For example, the driver attribute target values may be calculated utilizing the category formulas, as is described above.

A vehicle recommendation is generated at step 114 based on at least the vehicle attribute data and the driver attribute target values. The vehicle recommendations are compared to inventory and dealership information at step 116. For example, the driver location information stored in the driver profile data may be utilized to identify dealerships or other sales locations where the recommended vehicle or vehicles are being sold. As described above, the vehicle recommender system 10 may have an inventory database storing information regarding available vehicle inventory. The recommended vehicle information, such as vehicle class IDs outputted by the recommender neural network 50, can be compared against the available vehicle inventory within a threshold mileage of the driver's home location, for example. Moreover, the vehicle inventory information may include price and available purchase methods (e.g. financing rates and/or lease rates) etc. Such information can be compared against the driver profile data, and particularly the driver profile data regarding past and current vehicle financing and/or purchase. Purchase recommendations are then generated at step 118. As described above, purchase recommendations 82 may include information regarding where to buy (such as which dealership), which inventory to buy (such as which exact vehicle, e.g. by VIN number or other identifier), when to buy (such as based on current vehicle service life, market value or when a promotion starts or ends), and how to buy (such as cash, lease, or finance).

Figure 6:
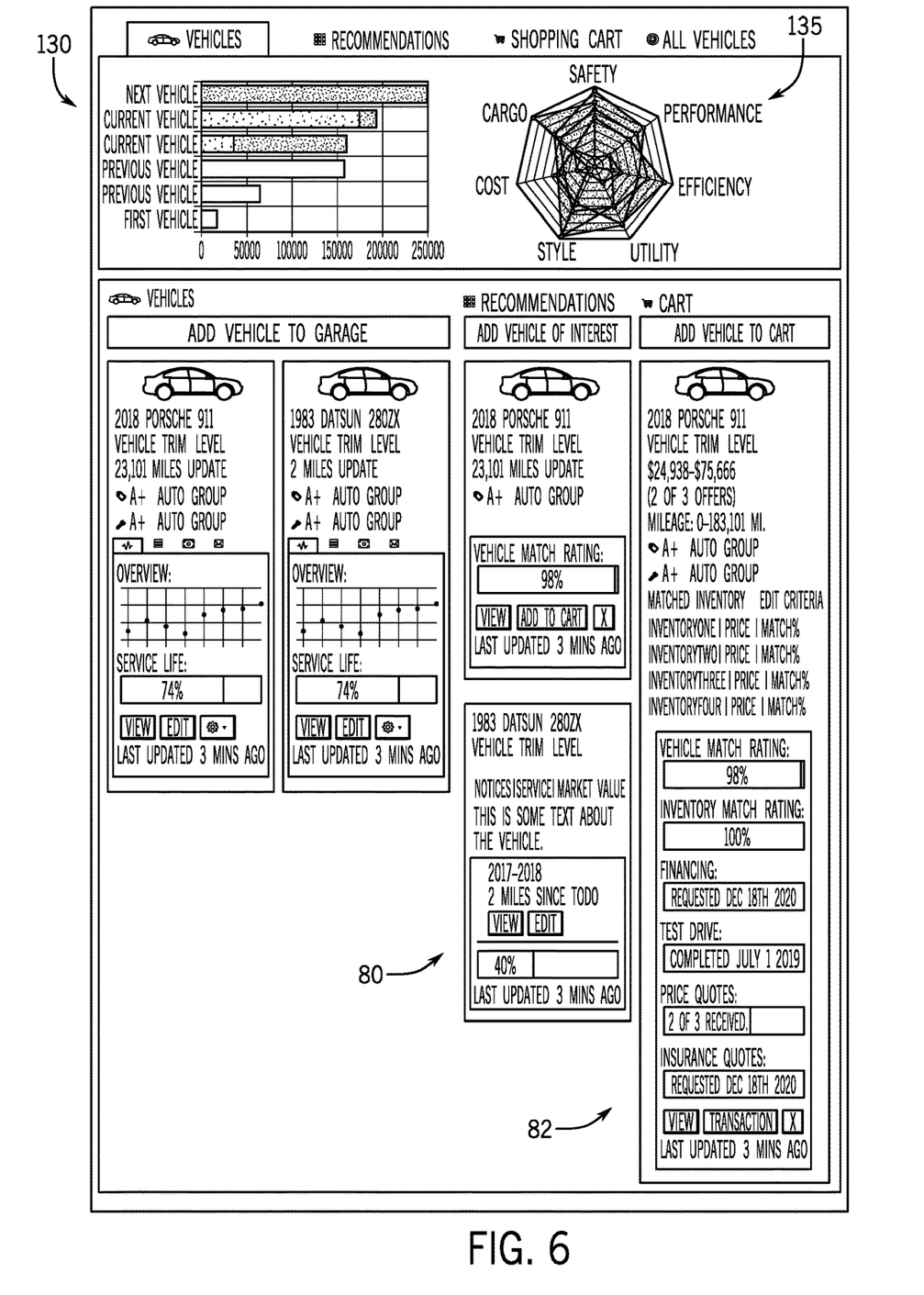
FIG. 6 depicts an exemplary user interface for displaying vehicle recommendations generated for a driver, as well as purchase recommendations.

FIG. 6 shows one exemplary user interface visually depicting driver profile data, vehicle recommendations 80, and vehicle purchase recommendations 82 for a particular driver. In addition to user-generated driver profile data, such as current and previous vehicle information, enriched driver profile data may also be displayed, such as via a web interface or an application installed on a user's device. In certain examples, graphs and/or metrics may be generated and displayed on the UI to visually depict or describe the driver profile data and/or the vehicle recommendations 80. In FIG. 6, a bar graph 130 visually depicts mileage information for all current and previous vehicles, as well as for one or more recommended future vehicles. A radial chart 135 visually represents information regarding the vehicle recommendations 80, including how the vehicle attribute data for each of the recommended vehicles aligns with the driver attribute target values for each vehicle attribute category.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A vehicle recommender system comprising:
   a storage system storing a trained neural network trained to generate a vehicle recommendation, wherein the neural network is trained on vehicle database data and driver database data;
   a vehicle database comprising vehicle attribute data;
   a driver database comprising user-generated driver profile data, wherein the user-generated driver profile data includes at least one driving location, at least one driving route, a driver age, a driver occupation, a current vehicle, a current vehicle ownership type, a past vehicle, and a past vehicle ownership type;
   a processing system communicatively connected to the storage system and configured to:
      generate enriched driver profile data by comparing the user-generated driver profile data to location characteristic data and/or to social characteristic data, wherein the enriched driver profile data includes an expected vehicle spend value and each of an average snowfall, an average altitude, road condition information, an average driving speed, and an estimated commute time;
      calculate a driver attribute target value for each vehicle attribute category in a list of vehicle attribute categories based on the driver profile data, which includes the enriched driver profile data and the user-generated driver profile data; and
      using the trained neural network, generate at least one vehicle recommendation based on at least the vehicle attribute data, the driver attribute target values and the driver profile data, including the enriched driver profile data and the user-generated driver profile data, wherein the trained neural network functions as a hybrid recommender system performing content-based filtering and collaborative filtering.

2. The system of claim 1, wherein the location characteristic data includes data from the National Weather Service.

3. The system of claim 1, wherein the social characteristic data includes census data.

4. The system of claim 1, wherein the enriched driver profile data further includes an income value.

5. The system of claim 1, wherein the user-generated driver profile data further includes at least one corresponding vehicle rating for each current vehicle and past vehicle.

6. The system of claim 1, wherein the processing system is further configured to determine at least one vehicle purchase recommendation based on the at least one vehicle recommendation, wherein the vehicle purchase recommendation includes at least one of a recommended purchase location, a recommended inventory, a recommended purchase time, and a recommended purchase method.

7. The system of claim 1, wherein the neural network is trained using a Weighted Approximate-Rank Pairwise (WARP) loss function.

8. A method of generating a vehicle recommendation for a driver, the method comprising:
   receiving driver profile data about a driver, wherein the driver profile data includes user-generated driver profile data and enriched profile data;
   wherein the user-generated driver profile data includes at least one driving location, at least one driving route, a driver age, a driver occupation, a current vehicle, a current vehicle ownership type, a past vehicle, and a past vehicle ownership type;
   wherein the enriched driver profile data includes an expected vehicle spend value and each of an average snowfall, an average altitude, road condition information, an average driving speed, and an estimated commute time;
   receiving vehicle attribute data regarding each vehicle class in a list of vehicle classes;
   receiving a list of vehicle attribute categories;
   generating a driver attribute target value for each vehicle attribute category based on the driver profile data; and
   providing the enriched driver profile data, the user-generated driver profile data, the vehicle attribute data, and the driver attribute target values as input data to a trained neural network to generate, by the trained neural network, at least one vehicle recommendation, wherein the trained neural network functions as a hybrid recommender system performing content-based filtering and collaborative filtering and wherein the neural network is trained on vehicle attribute data and driver profile data.

9. The method of claim 8, further comprising:
   receiving location characteristic data and social characteristic data;
   further comprising generating the driver attribute target value based on the location characteristic data and the social characteristic data.

10. The method of claim 9, wherein the location characteristic data includes data from the National Weather Service and wherein the social characteristic data includes census data.

11. The method of claim 8, wherein the driver profile data further includes at least one of a current vehicle, a current vehicle ownership type, a past vehicle, and a past vehicle ownership type.

12. The method of claim 11, wherein the user-generated driver profile data further includes at least one corresponding vehicle rating for each current vehicle and past vehicle.

13. The method of claim 8, further comprising training the neural network trained using a Weighted Approximate-Rank Pairwise (WARP) loss function, and wherein the trained neural network functions as the hybrid recommender system performing the content-based filtering and the collaborative filtering of the driver profile data, the vehicle attribute data, and the driver attribute target values.

14. A method of generating a vehicle recommendation for a driver, the method comprising:
  storing a list of vehicle attribute categories;
  storing vehicle attribute data for each vehicle class in a list of vehicle classes, wherein the vehicle attribute data includes, for each vehicle class, a vehicle attribute value for each vehicle attribute category;
  storing user-generated driver profile data inputted by a driver, wherein the user-generated driver profile data includes at least one driving location, at least one driving route, a driver age, and a driver occupation, a current vehicle, a current vehicle ownership type, a past vehicle, a past vehicle ownership type, a current owned vehicle rating, and a past owned vehicle rating;
  storing location characteristic data and social characteristic data;
  generating enriched driver profile data by comparing the user-generated driver profile data to the location characteristic data and/or to the social characteristic data, wherein the enriched driver profile data includes an expected vehicle spend value and each of an average snowfall, an average altitude, road condition information, an average driving speed, and an estimated commute time;
  calculating a driver attribute target value for each vehicle attribute category in the list of vehicle attribute categories based on the driver profile data, which includes the enriched driver profile data and the user-generated driver profile data; and
  providing the enriched driver profile data, the user-generated driver profile data, the vehicle attribute data, and the driver attribute target values as input data to a trained neural network to generate at least one vehicle recommendation, wherein the trained neural network functions as a hybrid recommender system performing content-based filtering and collaborative filtering and wherein the neural network is trained on vehicle attribute data and driver profile data.

15. The method of claim 14, further comprising determining at least one vehicle purchase recommendation based on the at least one vehicle recommendation, wherein the vehicle purchase recommendation includes at least one of a recommended purchase location, a recommended inventory, a recommended purchase time, and a recommended purchase method.

* * * * *